United States Patent
Yamamoto et al.

(10) Patent No.: US 7,032,130 B2
(45) Date of Patent: Apr. 18, 2006

(54) METHOD AND SYSTEM FOR MANAGING SUBJECT DEVICE THROUGH NETWORK AND INFORMATION PROCESSING SYSTEM PERFORMING MANAGEMENT

(75) Inventors: Masanobu Yamamoto, Odawara (JP); Tomomi Ogawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 507 days.

(21) Appl. No.: 10/075,990

(22) Filed: Feb. 15, 2002

(65) Prior Publication Data

US 2003/0065972 A1 Apr. 3, 2003

(30) Foreign Application Priority Data

Oct. 3, 2001 (JP) ........................... 2001-307313

(51) Int. Cl.
*G06F 11/00* (2006.01)

(52) U.S. Cl. .................. 714/13; 714/4; 714/14
(58) Field of Classification Search ............ 714/4, 714/5, 7, 13, 14
See application file for complete search history.

(56) References Cited

U.S. PATENT DOCUMENTS

| | | | | |
|---|---|---|---|---|
| 5,696,895 A | * | 12/1997 | Hemphill et al. | 714/4 |
| 5,790,775 A | * | 8/1998 | Marks et al. | 714/9 |
| 6,578,158 B1 | * | 6/2003 | Deitz et al. | 714/11 |
| 6,618,821 B1 | * | 9/2003 | Duncan et al. | 714/14 |
| 6,625,753 B1 | * | 9/2003 | Skogman et al. | 714/13 |
| 6,715,098 B1 | * | 3/2004 | Chen et al. | 714/3 |

FOREIGN PATENT DOCUMENTS

| | | |
|---|---|---|
| JP | 6-59924 | 3/1994 |
| JP | 9-326810 | 12/1997 |
| JP | 11-220496 | 8/1999 |
| JP | 2000-244526 | 9/2000 |

* cited by examiner

*Primary Examiner*—Robert Beausoliel
*Assistant Examiner*—Marc M Duncan
(74) *Attorney, Agent, or Firm*—Mattingly, Stanger, Malur & Brundidge, P.C.

(57) ABSTRACT

In a system for performing maintenance/management on a subject machine with a maintenance/management control equipment via a network, a connecting section of the machine for the network is implemented in a duplex configuration including a main maintenance/management processing unit and an auxiliary maintenance/management processing unit equipped with respective power supply units independently from each other. When maintenance/management processing is changed over to the auxiliary maintenance/management processing unit from the main unit upon occurrence of fault in the latter, the auxiliary maintenance/management processing unit takes over the network address of the main maintenance/management processing unit for continuing the maintenance/management processing without coming under notice of the maintenance/management control equipment.

11 Claims, 8 Drawing Sheets

METHOD AND SYSTEM FOR MANAGING SUBJECT DEVICE THROUGH NETWORK AND INFORMATION PROCESSING SYSTEM PERFORMING MANAGEMENT

BACKGROUND OF THE INVENTION

The present invention generally relates to a maintenance and/or management (maintenance/management) technique and an information processing technique. Particularly, the invention relates to a technique which can effectively and advantageously be applied for effectuating maintenance/management of a concerned machine such as information processing apparatus or the like from a remote site through the medium of an information network. More particularly, the present invention is concerned with a technique which can effectively and advantageously be applied to realization of maintenance/management function for a concerned machine, apparatus, device, equipment or the like through an information network typified by a SNMP (Simple Network Management Protocol) network.

In the information processing system such as, for example, a disk array system, importance of maintenance/management work increases in accompanying with the trend of implementing the system on a large and larger scale with increasing complexity. Under the circumstances, maintenance/management of the system by manufacturer or other relevant party from a remote site is coming into general practice in addition to the maintenance/management performed by the user.

By way of example, the disk array system is equipped with a service processor (hereinafter also referred to as the SVP in short) which is constituted by a personal computer the like. On the other hand, the SVP is connected to an external information network such as the internet or the like with a view to realizing remote maintenance/management, e.g. issuance of various commands concerning maintenance/management of the system to the SVP and collection of the operation status information of the system by the maintenance/management control equipment through the information network.

In that case, general-purpose or generalized maintenance/management protocol such as SNMP (Simple Network Management Protocol) can be adopted for the maintenance/management control equipment and the SVP.

As the related technology known heretofore, there may be mentioned one disclosed in Japanese Patent Application Laid-Open Publication No. 326810/1997 entitled "Connection Changeover Method on Occurrence of Fault" (reference (1)). According to this technology, LAN adapters connected to hosts implemented in duplex as operating and standby ones, respectively, are assigned with same MAC address and IP address, respectively, wherein upon interchanging of the hosts for coping with a fault occurring in the operating host, the LAN adapter therefor is invalidated while that for the standby host is validated, to thereby realize the changeover of the host systems.

Further, Japanese Patent Application Laid-Open Publication No. 59924/1994 entitled "Switching System for Duplex System" (reference (2)) discloses a system in which upon changeover of the hosts due to occurrence of a fault, the address (port number) of the host which is to take over the fault-suffering host is messaged to each of individual terminals.

Additionally, Japanese Patent Application Laid-Open Publication No. 244526/2000 entitled "Multiplexed Network Connector System" (reference 3) discloses a technique for changing over by an internal switch the connections to duplexed network connector systems connected to a single host and assigned with a same MAC address.

SUMMARY OF THE INVENTION

In the maintenance/management systems known heretofore, however, the SVP connected to the information network is not duplexed. Accordingly, when a fault or abnormality occurs in the SVP, the maintenance/management control equipment can certainly know occurrence of the fault itself. However, the maintenance/management control equipment is not in the position to identify concretely the location or portion of the system which suffers abnormality in reality. Consequently, the service man or woman in charge of maintenance has to go to the site where the concerned system is installed in order to check or ascertain the faulty portion, which of course involves troublesome work and burden.

Further, in the system disclosed in the reference (1) mentioned above, same IP address and MAC address are used for the duplexed LAN adapters. Consequently, so long as the operating system is active, the standby system has to remain in the invalidated state. This means that in the state where the system is operating, it is impossible to check whether or not the standby system can operate satisfactorily, giving rise to a technical problem remaining to be solved.

Further, in the system disclosed in the reference (2) cited above, the port number of the host (normal host) which is to taken over the fault suffering host is informed to each of the individual terminals which is then required to switch the connection to the newly connected host. Accordingly, such arrangement has to be adopted which allows both the terminals and the host to become aware of the connection changeovers effectuated therebetween.

Additionally, in the system disclosed in the reference (3) mentioned above, same MAC address is assigned to the duplex network connectors. Consequently, there may unwantedly arise such situation that the normal network operation is disturbed.

In the light of the state of the art described above, it is an object of the present invention to provide a method and a system for maintenance/management of a subject machine through a network and an information processing system therefor which can solve the problems of the hitherto known techniques.

Another object of the present invention is to provide a method and a system for maintenance/management of a subject machine through an information network and an information processing system therefor which can perform maintenance/management on the subject machine (i.e., maintenance/management-subjected machine) via an information network continuously even if a fault takes place in a maintenance/management processing unit providing multiplexing the maintenance/management processing units in multiplex in association with the maintenance/management-subjected machine.

Still another object of the present invention is to provide a method and a system for maintenance/management of a subject machine through an information network and an information processing system therefor which can perform maintenance/management on the subject machine (i.e., maintenance/management-subjected machine) through information network continuously without causing maintenance/management control equipment to be aware of interchange of the maintenance/management processing units provided in redundancy in association with the maintenance/management-subjected machine.

Yet another object of the present invention is to provide a method and a system for maintenance/management of a subject machine through an information network and an information processing system therefor which can execute continuously maintenance/management processing on the subject machine (i.e., maintenance/management-subjected machine) by interchanging maintenance/management processing units provided with redundancy for the maintenance/management-subjected machine without bringing about confusion among the addresses on the information network.

According to an aspect of the present invention, there is proposed a redundant system configuration in which a plurality of maintenance/management processing units are provided internally of a maintenance/management-subjected machine managed by a maintenance/management control equipment through an information network in such arrangement that the maintenance/management processing units can transfer or exchange information with the maintenance/management control equipment through the information network.

In a mode for carrying out the present invention, such system arrangement as described below may be adopted. The maintenance/management processing unit for the maintenance/management-subjected machine is designed to receive request(s) or command(s) from the maintenance/management control equipment connected to the information network. In practice, only one of two maintenance/management processing units is operating constantly while the other is placed in the standby state. Operation of the one maintenance/management processing unit is supervised or monitored by the other placed in the standby state and by a main machinery section of the maintenance/management-subjected machine. Upon detection of operation abnormality of the operating maintenance/management processing unit, the main machinery section interrupts electric power supply to the operating maintenance/management processing unit to thereby cause the operation of the operating maintenance/management processing unit to be stopped completely. Subsequently, the standby maintenance/management processing unit is activated. The activated maintenance/management processing unit then changes its own network address with the network address of the maintenance/management processing unit which has been stopped due to the fault, the addresses being registered in the maintenance/management control equipment. In this way, the activated maintenance/management processing unit can process the request(s) issued from the maintenance/management control equipment or send a fault information to the maintenance/management control equipment in place of the maintenance/management processing unit operated till then and now stopped without causing the maintenance/management control equipment to become aware of the interchange of the maintenance/management processing units.

By virtue of the arrangement taught by the present invention as described above, the maintenance/management for the subject machine, i.e., the maintenance/management-subjected machine, can be carried out continuously notwithstanding of fault occurrence in the maintenance/management processing unit because of multiplexed provision of the maintenance/management processing units for the maintenance/management-subjected machine, to an advantageous effect.

Further, maintenance/management of the subject machine can be performed continuously through the information network without making the maintenance/management control equipment be aware of interchange of the maintenance/management processing units provided with redundancy, to another advantageous effect.

Furthermore, the maintenance/management processing can continuously be executed by interchanging the maintenance/management processing units provided with redundancy in association with the subject machine without bringing about any conflict or confusion among the addresses on the information network, to a further advantageous effect.

Other objects, features and advantages of the invention will become apparent from the following description of the embodiments of the invention taken in conjunction with the accompanying drawings.

DESCRIPTION OF THE EMBODIMENTS

Figure 1:
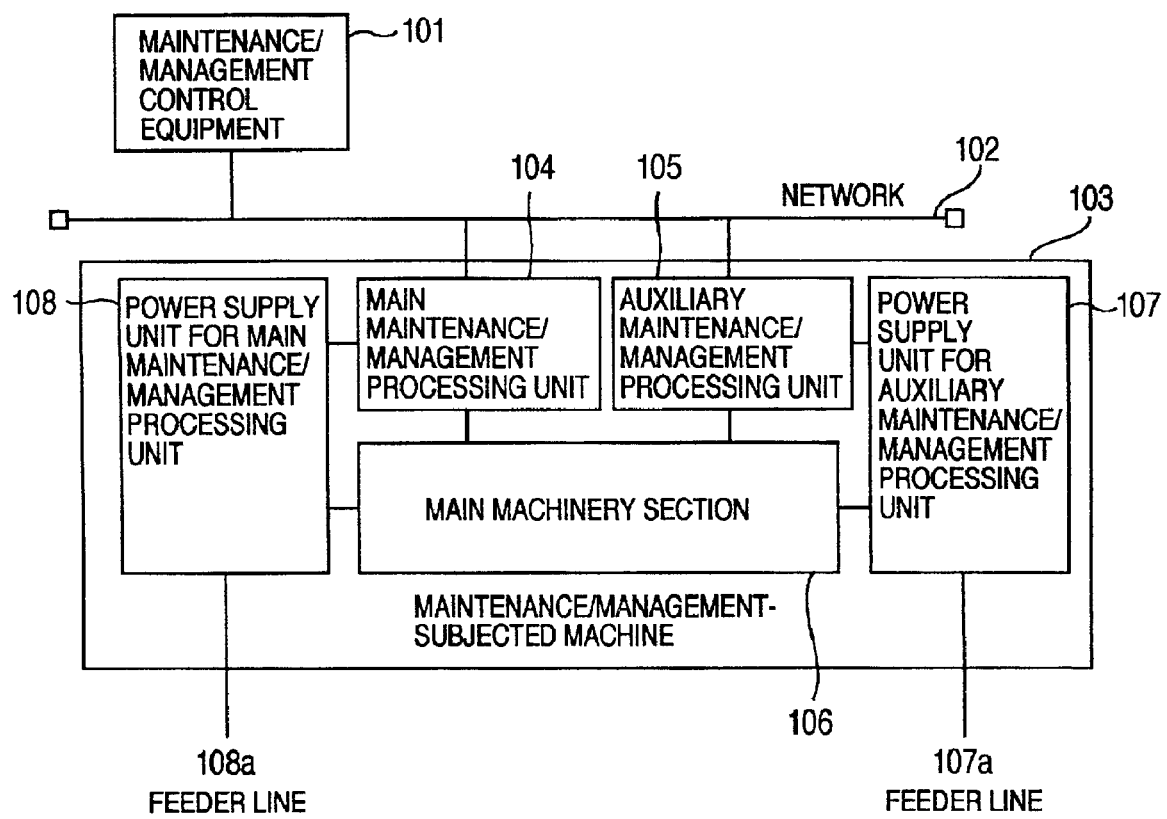
FIG. 1 is a conceptional block diagram showing generally and schematically an exemplary configuration of a maintenance/management system for carrying out a maintenance/management method according to an embodiment of the present invention.

The present invention will be described in detail in conjunction with what is presently considered as preferred or typical embodiments thereof by reference to the drawings. In the following description, components serving for like or equivalent functions are designated by like reference numerals and repeated description in detail thereof will be omitted.

FIG. 1 is a conceptional block diagram showing generally and schematically an exemplary configuration of a maintenance/management system for carrying out a maintenance/management method according to an embodiment of the present invention.

The maintenance/management system now under consideration is comprised of a maintenance/management control equipment 101, a machine or apparatus or equipment 103 which is subjected to maintenance/management performed by the maintenance/management control equipment 101 and a network 102 such as a LAN (Local Area Network), an internet or the like for interconnecting both the maintenance/management control equipment 101 and the machine or apparatus or equipment 103 subjected to maintenance/management. The machine or apparatus or equipment 103 mentioned above will hereinafter be referred to as the maintenance/management-subjected machine only for the convenience of description.

The maintenance/management-subjected machine 103 includes a main machinery section 106, a main maintenance/management processing unit 104 and an auxiliary maintenance/management processing unit 105 provided redundantly in duplex, both being connected to the network 102, a power supply unit 108 for the main maintenance/management processing unit 104 and a power supply unit 107 for the auxiliary maintenance/management processing unit 105, both being provided redundantly in duplex and designed for supplying electric power, respectively, to the main maintenance/management processing unit 104 and the auxiliary maintenance/management processing unit 105 independently from each other. Needless to say, the maintenance/management-subjected machine 103 may additionally include other components as the case may be. The power supply unit 108 for the main maintenance/management processing unit 104 and the power supply unit 107 for the auxiliary maintenance/management processing unit 105 are fed with electric power externally via feeder lines 108a and 107a, respectively.

Each of the main maintenance/management processing unit 104 and the auxiliary maintenance/management processing unit 105 provided with redundancy is assigned with a physical address such as a MAC address (Media Access Control address) or the like and a logical address such as an IP address (Internet Protocol address) or the like on the network 102, the addresses of the main maintenance/management processing unit 104 and the auxiliary maintenance/management processing unit 105 being different from each other, wherein information communication can be realized between the main maintenance/management processing unit 104 and the auxiliary maintenance/management processing unit 105 via the network 102 in accordance with the protocol such as TCP/IP (Transmission Control Protocol/Internet Protocol) or the like. In addition, each of the main maintenance/management processing unit 104 and the auxiliary maintenance/management processing unit 105 is independently capable of performing information communication with the maintenance/management control equipment 101 via the network 102.

At this juncture, it should however be mentioned that in the case of the maintenance/management system according to the instant embodiment of the invention, the logical address only of the main maintenance/management processing unit 104 is registered in the maintenance/management control equipment 101. In other words, the logical address of the auxiliary maintenance/management processing unit 105 is not registered in the maintenance/management control equipment 101. Consequently, the maintenance/management control equipment 101 can recognize only the main maintenance/management processing unit 104 (i.e., the logical address of the main maintenance/management processing unit 104) on the network 102. Thus, the maintenance/management control equipment 101 is in the position to perform the maintenance/management for the main machinery section 106 through the medium of the main maintenance/management processing unit 104.

Further, one or each of the main machinery section 106 and the power supply unit 108 for the main maintenance/management processing unit 104 is imparted with a function for monitoring or supervising the operating state of the main maintenance/management processing unit 104 which is put into operation in the normal state, for detecting presence/absence or occurrence of abnormality in the main maintenance/management processing unit 104 and additionally a function for responding to detection of occurrence of abnormality in the main maintenance/management processing unit 104 to thereby issue a command for changing over or switching the maintenance/management processing being executed for the main machinery section 106 by the main maintenance/management processing unit 104 to the auxiliary maintenance/management processing unit 105 so that upon occurrence of abnormality in the main maintenance/management processing unit 104, the auxiliary maintenance/management processing unit 105 can take over the maintenance/management processing for the main machinery section 106.

Additionally, the main maintenance/management processing unit 104 is so designed as to perform information communication with the auxiliary maintenance/management processing unit 105 as well via the network 102 in a proper timing for the purpose of supervising occurrence of abnormality in the auxiliary maintenance/management processing unit 105 while copying information such as configuration information, operation status information, maintenance/management information and others concerning the main machinery section 106 as stored in the course of operation thereof under the control of the maintenance/management control equipment 101 to the auxiliary maintenance/management processing unit 105 for storage therein in preparation for allowing the auxiliary maintenance/management processing unit 105 to replace the main maintenance/management processing unit 104 upon occurrence of abnormality in the latter.

Furthermore, the auxiliary maintenance/management processing unit 105 is designed to acquire the logical address of the main maintenance/management processing unit 104 on the network 102 in the course of the information communication with the latter via the network 102. The logical address of the main maintenance/management processing unit 104 as acquired is then stored in the auxiliary maintenance/management processing unit 105.

In the ordinary or normal operation state of the system, the main maintenance/management processing unit 104 performs the maintenance/management processing on the main machinery section 106 in conformance with the command(s) or request(s) issued from the maintenance/management control equipment 101, as described previously. When occurrence of abnormality in the main maintenance/management processing unit 104 is detected by one of the main machinery section 106 and the power supply unit 108 for the main maintenance/management processing unit 104, the power supply to the main maintenance/management processing unit 104 from the power supply unit 108 is stopped or interrupted while the auxiliary maintenance/management processing unit 105 initiates the processing for replacing the main maintenance/management processing unit 104 in response to the relevant command issued from the main machinery section 106.

More specifically, the auxiliary maintenance/management processing unit 105 rewrites its own logical address to the original logical address of the main maintenance/management processing unit 104 on the basis of the command issued from the main machinery section 106. In succession, the auxiliary maintenance/management processing unit 105 is operatively connected to the network 102 to thereby start the maintenance/management processing for the main machinery section 106 under the command of the maintenance/management control equipment 101 by making use of the information copied up to then from the main maintenance/management processing unit 104.

In that case, for the maintenance/management control equipment 101, the logical address of the auxiliary maintenance/management processing unit 105 is same as that of the main maintenance/management processing unit 104 which has previously been registered. Besides, various information required for the maintenance/management as well as other information has properly been taken over to the auxiliary maintenance/management processing unit 105 from the main maintenance/management processing unit 104. Accordingly, the maintenance/management control equipment 101 is capable of continuing the maintenance/management processing for the main machinery section 106 without being aware of the fact that the main maintenance/management processing unit 104 has been replaced by the auxiliary maintenance/management processing unit 105.

In the following, functions and operations of the maintenance/management system according to the instant embodiment of the invention will be described, by way of example only, by reference to a flow chart shown in FIG. 2.

In the ordinary or normal operation state of the system, the main maintenance/management processing unit 104 is in charge of processing the maintenance/management request (s) issued from the maintenance/management control equipment 101. In the case where the auxiliary maintenance/management processing unit 105 is also being activated, the main maintenance/management processing unit 104 periodically executes the processing for confirming operation of the auxiliary maintenance/management processing unit 105 and at the same time copies the maintenance/management information concerning the main machinery section 106 as well as other information as required to the auxiliary maintenance/management processing unit 105, which information is required when the auxiliary maintenance/management processing unit 105 takes over the processing from the main maintenance/management processing unit 104 upon occurrence of abnormality in the latter, as described previously. See step 400 in FIG. 2.

When the power supply unit 108 for the main maintenance/management processing unit 104 or alternatively the main machinery section 106 detects occurrence of abnormality in the operation of the main maintenance/management processing unit 104 in the course of execution of the processing described above (step 401), the power supply to the main maintenance/management processing unit 104 from the power supply unit 108 dedicated thereto is stopped or interrupted (step 402). In this conjunction, such arrangement may be adopted that in case the abnormality of operation of the main maintenance/management processing unit 104 is detected by the power supply unit 108 dedicated thereto, the result of the detection is firstly furnished to the main machinery section 106, in response to which the main machinery section 106 issues a command, whereon the power supply unit 108 stops the power supply to the main maintenance/management processing unit 104 in response to the command issued by the main machinery section 106. On the other hand, when the main machinery section 106 itself detects abnormality of operation of the main maintenance/management processing unit 104, then the main machinery section 106 responds thereto by issuing to the power supply unit 108 a command for stopping the power supply to the relevant main maintenance/management processing unit 104.

Subsequently, the main machinery section 106 issues a command or request for changeover of the maintenance/management processing to the auxiliary maintenance/management processing unit 105 (step 403).

At this juncture, it is to be mentioned that at the time point of interchange or shifting, the auxiliary maintenance/management processing unit 105 may be activated by initiating the power supply thereto. Alternatively, the power supply to the auxiliary maintenance/management processing unit 105 may ordinarily be kept alive so that upon occurrence of abnormality or fault in the main maintenance/management processing unit 104, the changeover operation can immediately be effectuated by issuing the changeover request or command to the auxiliary maintenance/management processing unit 105. In the latter case, the main maintenance/management processing unit 104 may be so arranged as to execute periodically the processing for confirming operation of the auxiliary maintenance/management processing unit 105 by way of the network 204 in the ordinary or normal operation state while performing operation for copying to the auxiliary maintenance/management processing unit 105 the information which is to be taken over to the auxiliary maintenance/management processing unit 105 upon occurrence of abnormality in the main maintenance/management processing unit 104. In that case, the auxiliary maintenance/management processing unit 105 may be so arranged as to supervise operation of the main maintenance/management processing unit 104 with a view to detecting occurrence of fault or abnormality in the main maintenance/management processing unit 104.

Upon reception of the changeover request, the auxiliary maintenance/management processing unit 105 changes the network address such as its own IP address or the like on the network 204 to the address assigned to the main maintenance/management processing unit 104 (step 404). As the address changing method to this end, there may be mentioned a method of rewriting the network address information contained in the commercially available OS (Operating System) configuration information or the like stored in a personal computer implementing the auxiliary maintenance/management processing unit 105 to the address of the main maintenance/management processing unit 104, whereon the address information as changed is validated by rebooting the auxiliary maintenance/management processing unit 105.

In the case of the maintenance/management system according to the instant embodiment of the invention, there will never arise such possibility that inter-address collision could occur, bringing about some confusion, notwithstanding of the fact that the auxiliary maintenance/management processing unit 105 uses the network address of the main maintenance/management processing unit 104. This is because the power supply to the main maintenance/management processing unit 104 is interrupted.

In this way, the auxiliary maintenance/management processing unit 105 whose network address has been changed to that of the main maintenance/management processing unit 104 is in the position to process the request issued from the maintenance/management control equipment 101 via the network 102 in place of the main maintenance/management processing unit 104.

As is apparent from the foregoing description, the management means for the main machinery section 106 connected to the network 102 is implemented with redundancy in the form of the main maintenance/management processing unit 104 and the auxiliary maintenance/management processing unit 105 which can be interchanged. By virtue of this arrangement, when a fault or abnormality should occur in the main machinery section 106 or other, discriminative identification of a faulty location can be realized with high accuracy by the maintenance/management control equipment 101 disposed at a remote site on the basis of the various information which is required for the maintenance/management of the main machinery section 106 and which has been transferred to the auxiliary maintenance/management processing unit 105 from the main maintenance/management processing unit 104. In other words, the faulty location which heretofore could not be identified without paying visit to the site where the trouble suffering maintenance/management-subjected machine 103 is installed can be discriminatively identified by the maintenance/management control equipment 101 located remotely from such maintenance/management-subjected machine according to the teaching of the present invention. Thus, the time required for taking proper measures such as acquisition of the parts for replacement and replacement of the parts can remarkably be decreased, whereby the system availability (utility and performance) can significantly be improved.

Further, by providing in duplex the network connecting section of the maintenance/management-subjected machine 103 for the main maintenance/management processing unit 104 and the auxiliary maintenance/management processing unit 105, respectively, it is sufficient to register only one network address in the maintenance/management control equipment 101. Thus, by adopting a generalized management protocol such as SNMP (Simple Network Management Protocol) or the like, the maintenance/management function of high reliability can be made available due to the duplex configuration such as mentioned above even under the generalized maintenance/management program running on the maintenance/management control equipment 101 even in the case where the latter is acquired from a third party or so-called third vendor.

Figure 3:
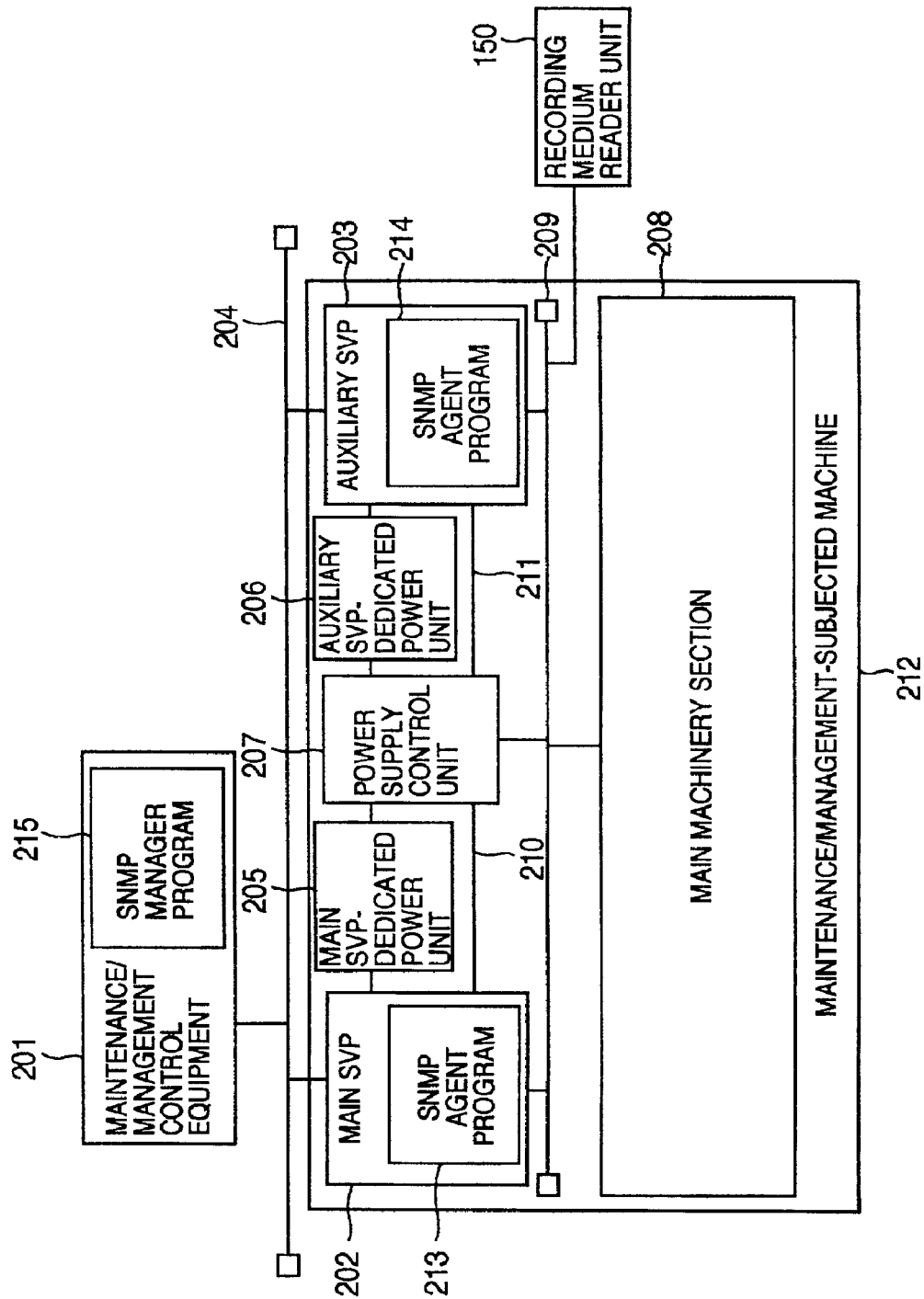
FIG. 3 is a conceptional block diagram showing generally and schematically another configuration of the maintenance/management system for carrying out a maintenance/management method according to another embodiment of the present invention.

FIG. 3 is a conceptional block diagram showing, by way of example, a configuration of the maintenance/management system for carrying out the maintenance/management method according to another embodiment of the present invention.

Referring to FIG. 3, a maintenance/management-subjected machine 212 to be subjected to maintenance/management incorporates or packages therein as service processors (hereinafter referred to as SVP in short) a pair of SVPs, i.e., a main SVP 202 and an auxiliary SVP 203. For operation of the main SVP 202 and the auxiliary SVP 203, there are provided independently a main SVP-dedicated power supply unit 205 (i.e., power supply unit 205 for the main SVP 202) and an auxiliary SVP-dedicated power supply unit 206 (i.e., power supply unit 206 for the auxiliary SVP 203), respectively. The power supply to the main SVP 202 and the auxiliary SVP 203 from the power supply units 205 and 206, respectively, as well as interruption of the power supply is controlled by means of a power supply control unit 207. Further, the power supply control unit 207 is so designed as to be capable of supervising the operation of the main SVP 202 and the auxiliary SVP 203, respectively, and issuing a changeover command to them through control lines 210 and 211, respectively.

In this conjunction, however, such arrangement may equally be adopted that in place of the power supply control unit 207, the main machinery section 208 supervises operations of the main SVP 202 and the auxiliary SVP 203, respectively, and issues the changeover command, etc., as the case may be. Alternatively, each of the power supply control unit 207 and the main machinery section 208 may be so designed as to supervise the operations of the main SVP 202 and the auxiliary SVP 203, respectively, and issue the changeover command, etc.

Figure 4:
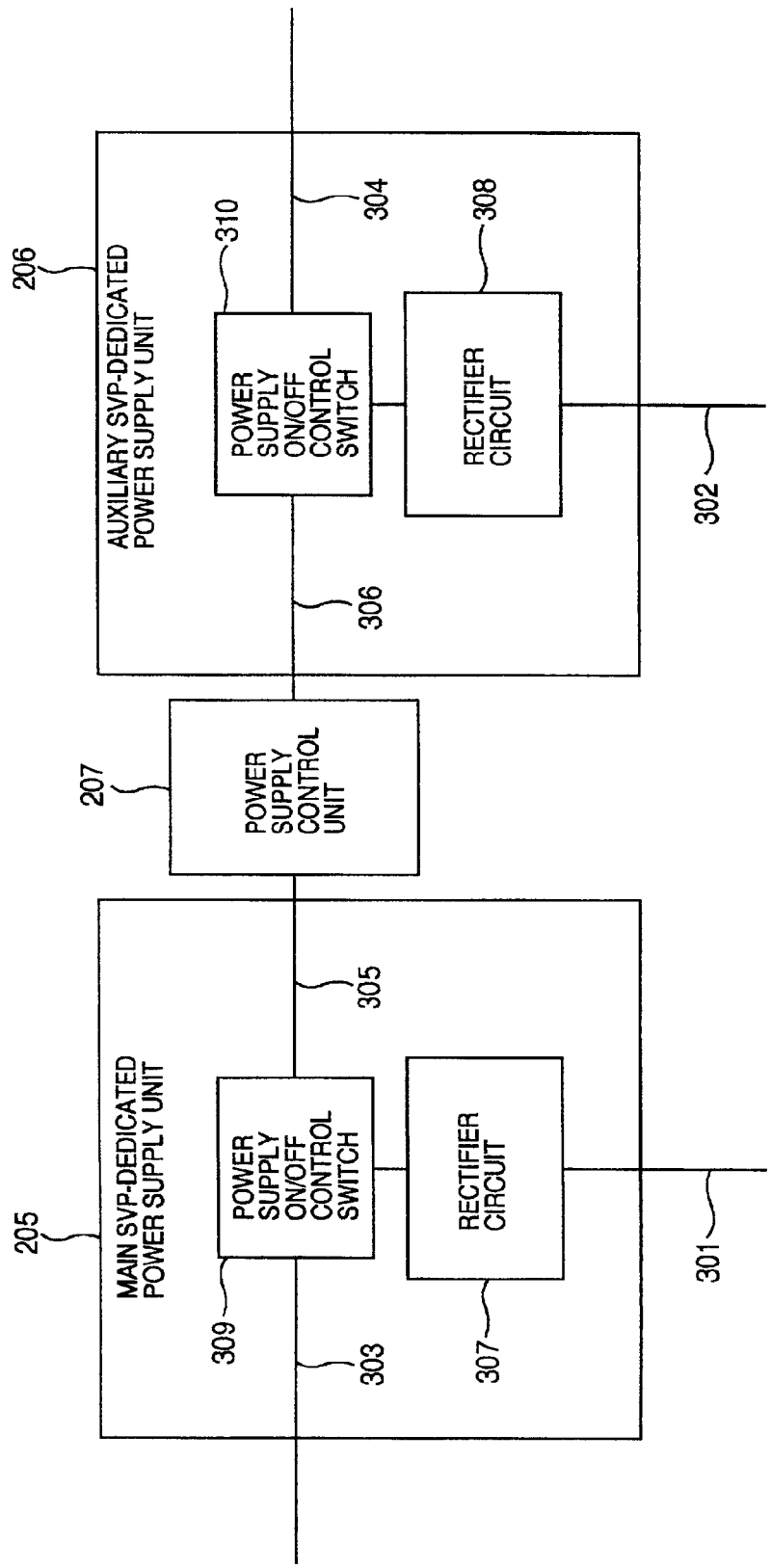
FIG. 4 is a conceptional block diagram showing in detail a portion of a structure of the maintenance/management system shown in FIG. 3.

FIG. 4 is a conceptional block diagram showing, by way of example, an arrangement for connecting the power supply control unit 207 with the main SVP-dedicated power supply unit 205 and the auxiliary SVP-dedicated power supply unit 206 in the maintenance/management system according to the instant embodiment of the present invention.

The main SVP-dedicated power supply unit 205 is comprised of a rectifier circuit 307 for generating a DC output power 303 to be supplied to the main SVP 202 on the basis of an externally supplied AC power 301 and a power supply control switch circuit 309 for on/off control of the DC power 303 supplied to the main SVP 202 in accordance with a command inputted from the power supply control unit 207 by way of a power supply control interface 305 for the main SVP 202.

Similarly, the auxiliary SVP-dedicated power supply unit 206 is comprised of a rectifier circuit 308 for generating a DC output power 304 to be supplied to the auxiliary SVP 203 on the basis of an externally supplied AC power 302 and a power supply control switch circuit 310 for on/off control of the DC output power 304 supplied to the auxiliary SVP 203 in accordance with a command inputted from the power supply control unit 207 by way of a power supply control interface 306 for the auxiliary SVP 203.

Both the main SVP 202 and the auxiliary SVP 203 are connected to the maintenance/management control equipment 201 via the network 204 such as an internet or the like (see FIG. 4) to perform information communication in accordance with a protocol such as e.g. TCP/IP (Transmission Control Protocol/Internet Protocol) or the like. In this conjunction, it should however be mentioned that the maintenance/management system according to the instant embodiment of the invention is implemented on the presumption that logical address such as the IP address or the like of the main SVP 202 on the network 204 is registered in the maintenance/management control equipment 201 and thus only the main SVP 202 (i.e., the logical address of the main SVP 202) can be recognized by the maintenance/management control equipment 201.

The main SVP 202 and the auxiliary SVP 203 differ from each other with regard to the physical address such as the MAC (Media Access Control) address and the logical address such as the IP (Internet Protocol) address on the network 204 and can perform information communication with each other by way of the network 204.

Further, the main SVP 202 and the auxiliary SVP 203 are connected to the main machinery section 208 via an internal network 209 such as LAN (Local Area Network) internally of the maintenance/management-subjected machine 212.

The main SVP 202 and the auxiliary SVP 203 may be constituted by personal computers or the like, respectively, in which application programs such as, for example, SNMP (Simple Network Management Protocol) agent programs 213 and 214 are installed, respectively, which program is so designed as to accept maintenance request such as request for restoration from a faulty state, command for reconfiguration (alteration of the system configuration) or the like issued, for example, from an SNMP manager program 215 installed in the maintenance/management control equipment 201 to thereby perform maintenance/management processing on the main machinery section 208.

Further, each of the main SVP 202 and the auxiliary SVP 203 is so designed as to inform the SNMP manager program 215 installed in the maintenance/management control equipment 201 to serve as the so-called "SNMP Trap" of fault information messaged from the main machinery section 208 to thereby cause the operator (i.e., system manager) of the maintenance/management control equipment 201 to become aware of occurrence of a fault in the main machinery section 208.

In the case of the maintenance/management system now under consideration, operation of the main SVP 202 and that of the auxiliary SVP 203 are checked by the power supply control unit 207. At the same time, operations of the main SVP 202 and the auxiliary SVP 203 are supervised or monitored by the main machinery section 208 via the internal network 209 as well.

Figure 5:
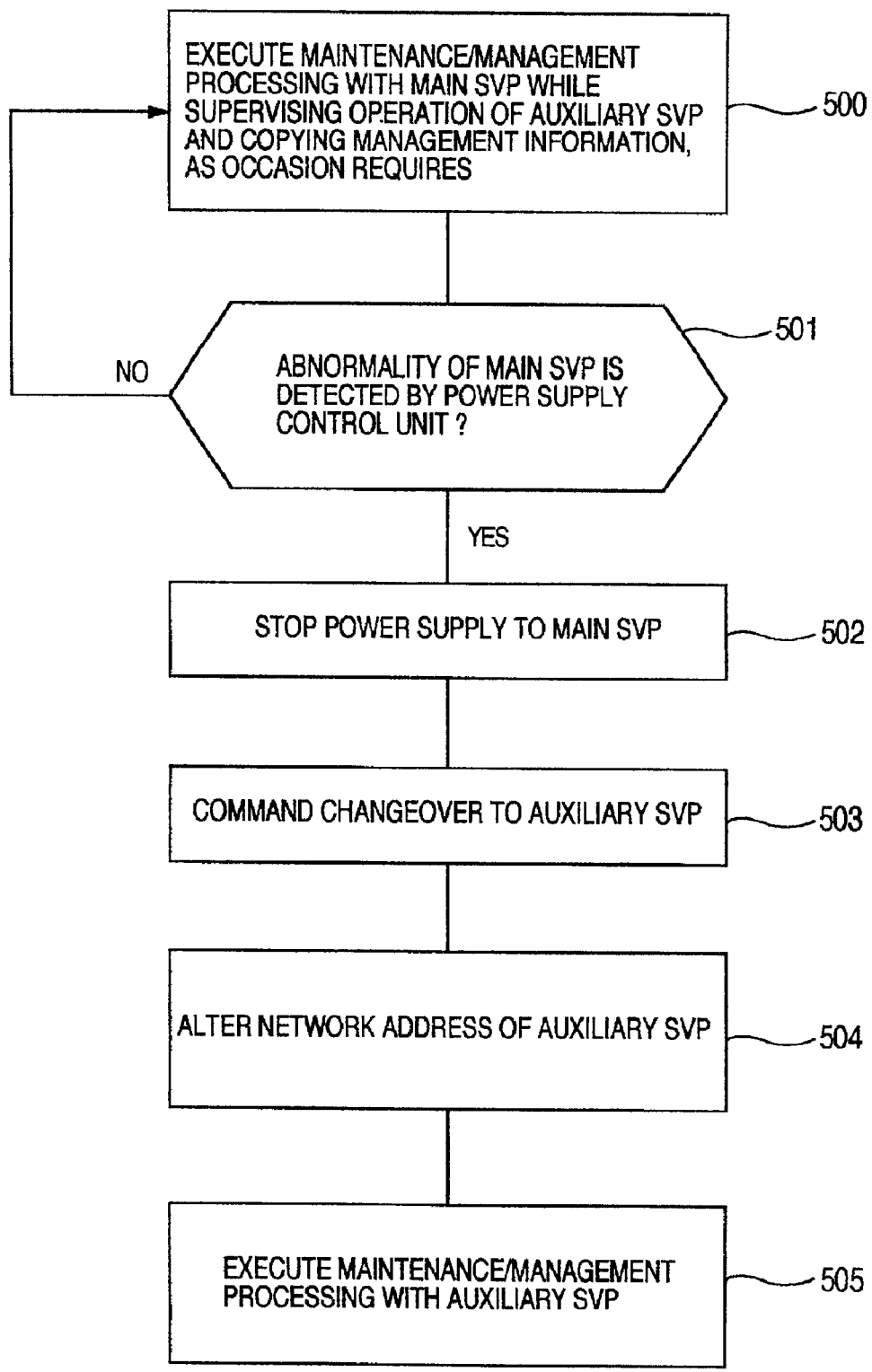
FIG. 5 is a flow chart for illustrating an exemplary operation of the maintenance/management system shown in FIGS. 3 and 4.
Figure 6:
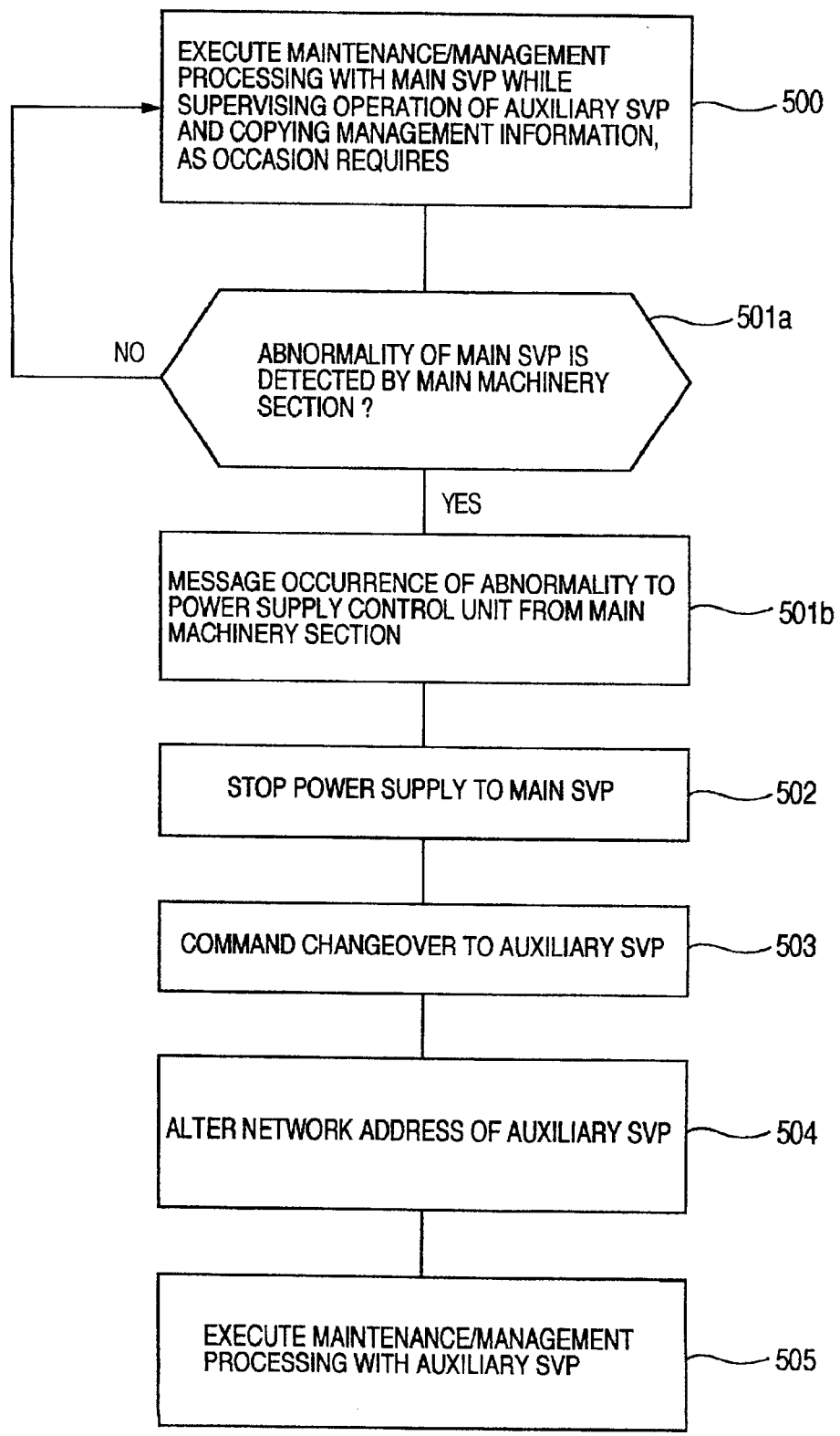
FIG. 6 is a flow chart for illustrating another exemplary operation of the maintenance/management system shown in FIGS. 3 and 4.
Figure 7:
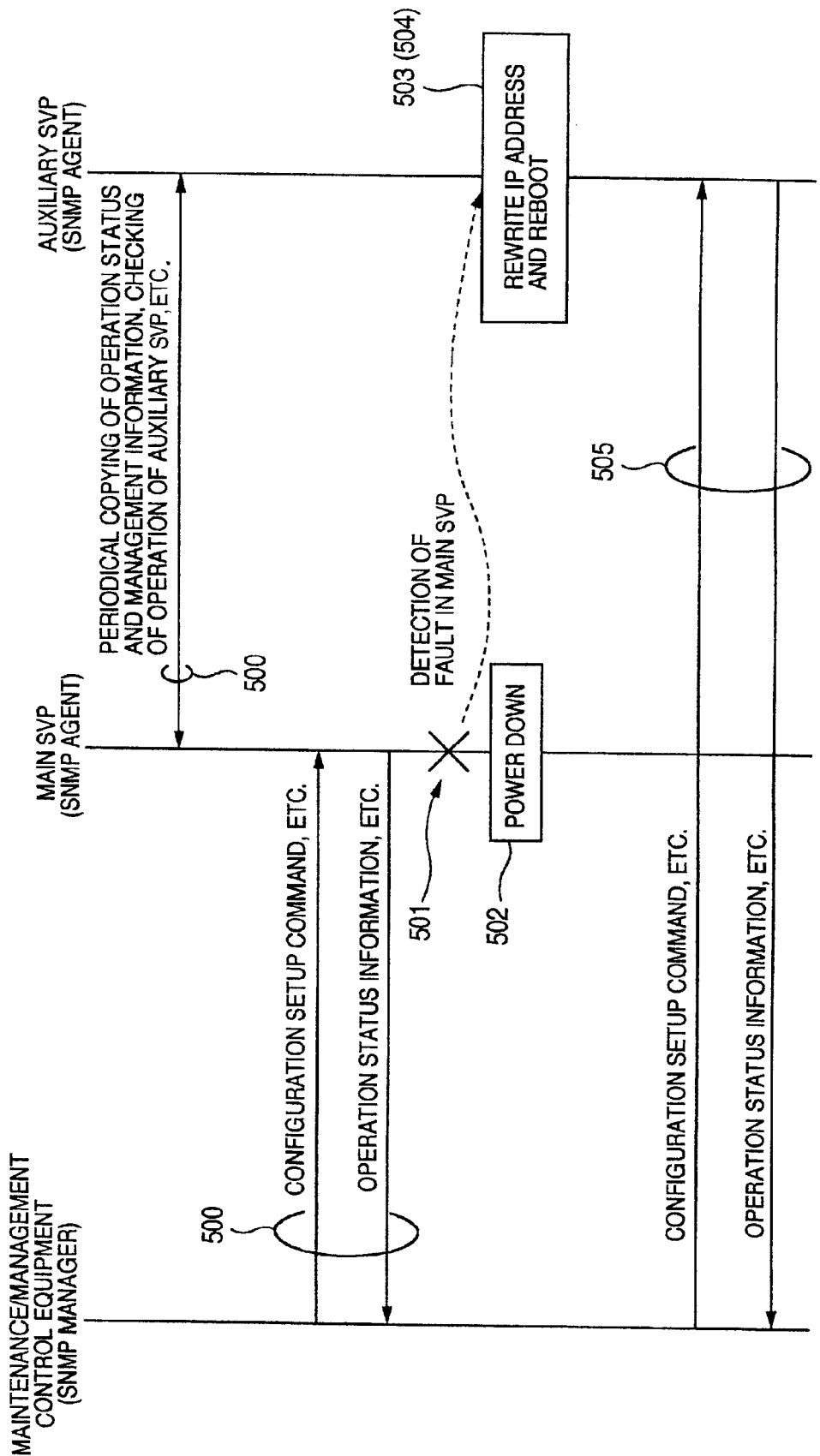
FIG. 7 is a flow chart for illustrating operation of the maintenance/management system shown in FIGS. 3 and 4.

In the following, description will be made of functions and operations of the maintenance/management system according to the instant embodiment of the invention by reference to flow charts shown in FIGS. 5 to 7, by way of example only. FIG. 5 shows a flow chart for illustrating an operation confirming procedure executed for the main SVP 202 by the power supply control unit 207.

Ordinarily, the main SVP 202 is in charge of processing the maintenance/management request issued from the maintenance/management control equipment 201. In the state where the auxiliary SVP 203 is being activated, the main SVP 202 periodically executes the processing for confirming or checking operation of the auxiliary SVP 203 and at the same time copies the maintenance/management information concerning the main machinery section 208 and others to the auxiliary SVP 203, which information is required to be available for to the auxiliary SVP 203 when the auxiliary SVP 203 takes over the main SVP 202 (step 500 in FIG. 5).

In case the power supply control unit 207 detects operation abnormality of the main SVP 202 in a step 501 in the course of executing the processing described above, operation of the main SVP 202 is stopped completely. In that case, the power supply control unit 207 controls the power supply on/off control switch 309 for the main SVP 202 by way of the power supply output control interface 305 to thereby interrupt the DC output power 303 for the main SVP 202 (step 502).

Subsequently, the power supply control unit 207 controls the power supply on/off control switch 310 for the auxiliary SVP 203 by way of the power supply output control interface 306 to thereby cause the DC output power 304 to be supplied to the auxiliary SVP 203 for activating the same. At the time point when the auxiliary SVP 203 has been activated, the power supply control unit 207 issues a request for changing over the maintenance/management processing to the auxiliary SVP 203 from the main SVP 202 (step 503).

At this juncture, it is to be mentioned that upon interchange of the main SVP to the auxiliary SVP, the auxiliary SVP 203 is activated in response to initiation of the power supply to the auxiliary SVP 203 in the case described above. However, the invention incarnated in the instant embodiment is not restricted thereto. Such arrangement can equally be adopted that the power supply to the auxiliary SVP 203 is ordinarily kept alive constantly so that upon occurrence of failure in the main SVP 202, the changeover operation can be effectuated straightforwardly by issuing the changeover request to the auxiliary SVP 203. In that case, the main SVP 202 is ordinarily capable of confirming or checking periodically the operation of the auxiliary SVP 203 by way of the network 204 while performing operation for copying to the auxiliary SVP 203 the information to be made available for the auxiliary SVP 203 when it takes over the processing performed by the main SVP 202 upon occurrence of failure in the latter. Parenthetically, in that case, operation of the main SVP 202 may be supervised by the auxiliary SVP 203 with a view to detecting occurrence of fault or abnormality in the main SVP 202.

Upon reception of the changeover request, the auxiliary SVP 203 changes its own network address such as the IP address or the like on the network 204 to the address assigned to the main SVP 202 (step 504). As the address changing method to this end, there can be conceived a method of rewriting the network address information contained in the commercially available OS (Operating System) configuration information or the like stored in a personal computer implementing the auxiliary SVP 203 to the address information of the main SVP 202, whereon the address information as changed is validated by rebooting the auxiliary SVP 203.

In the case of the maintenance/management system according to the instant embodiment of the invention, there will never arise such possibility that inter-address collision could occur, bringing about confusion, even when the auxiliary SVP 203 uses the network address of the main SVP 202, because the power supply to the main SVP 202 has been interrupted at this time point.

In this way, the auxiliary SVP 203 whose network address is changed to that of the main SVP 202 is now in the position to process the request issued from the maintenance/management control equipment 201 via the network 204 in place of the main SVP 202. In that case, since the network address assigned precedently to the main SVP 202 is used intactly, there arises no necessity for the maintenance/management control equipment 201 to be aware of the interchange between the main SVP 202 and the auxiliary SVP 203.

In other words, in the maintenance/management system according to the instant embodiment of the invention, it is utterly unnecessary to alter the specifications and others of the SNMP manager program 215 installed or packaged in the maintenance/management control equipment 201, while the anti-fault performance of the system can be enhanced owing to the redundant implementation of the SVP system constituted by the main SVP 202 and the auxiliary SVP 203.

To say in another way, even in the case where the SNMP manager program 215 installed in the maintenance/management control equipment 201 and the SNMP agent program 214 of the auxiliary SVP 203 differ from each other with regard to the maker or manufacturer thereof, the maintenance/management processing system can be operated without encountering any difficulty even though the SVP system is implemented in the redundant configuration so long as the SNMP protocol is abode by.

Further, during the period in which the maintenance/management operation is performed by the auxiliary SVP 203 in the step 505 mentioned above, the fault restoration operation of the main SVP 202 such as replacement or exchange of the main SVP 202 can be carried out. After the interchange of the main SVP 202 with the auxiliary SVP 203, operation of the auxiliary SVP 203 is supervised by the power supply control unit 207, and upon occurrence of a fault in the auxiliary SVP 203, the auxiliary SVP 203 is interchanged with the restored main SVP 202 through the procedure described hereinbefore.

Next, referring to a flow chart shown in FIG. 6, description will be made of the confirming operation performed on the main SVP 202 by the power supply control unit 207. As can be seen from the flow chart shown in FIG. 6, when fault or abnormality of the main SVP 202 is detected by the main machinery section 208 by way of the internal network 209 (step 501*a*), abnormality of the main SVP 202 is messaged to the power supply control unit 207 from the main machinery section 208 (step 501*b*). The succeeding processings are essentially same as those (steps 502 to 505) executed when abnormality of the main SVP 202 is detected by the power supply control unit 207, as described hereinbefore in conjunction with the flow chart shown in FIG. 5. Incidentally, the processing in the step 500 is similar to that illustrated in FIG. 5. Parenthetically, the contents of operations illustrated in the flow charts of FIGS. 5 and 6 are summarized in FIG. 7, which will be self-explanatory without any further elucidation.

Figure 8:
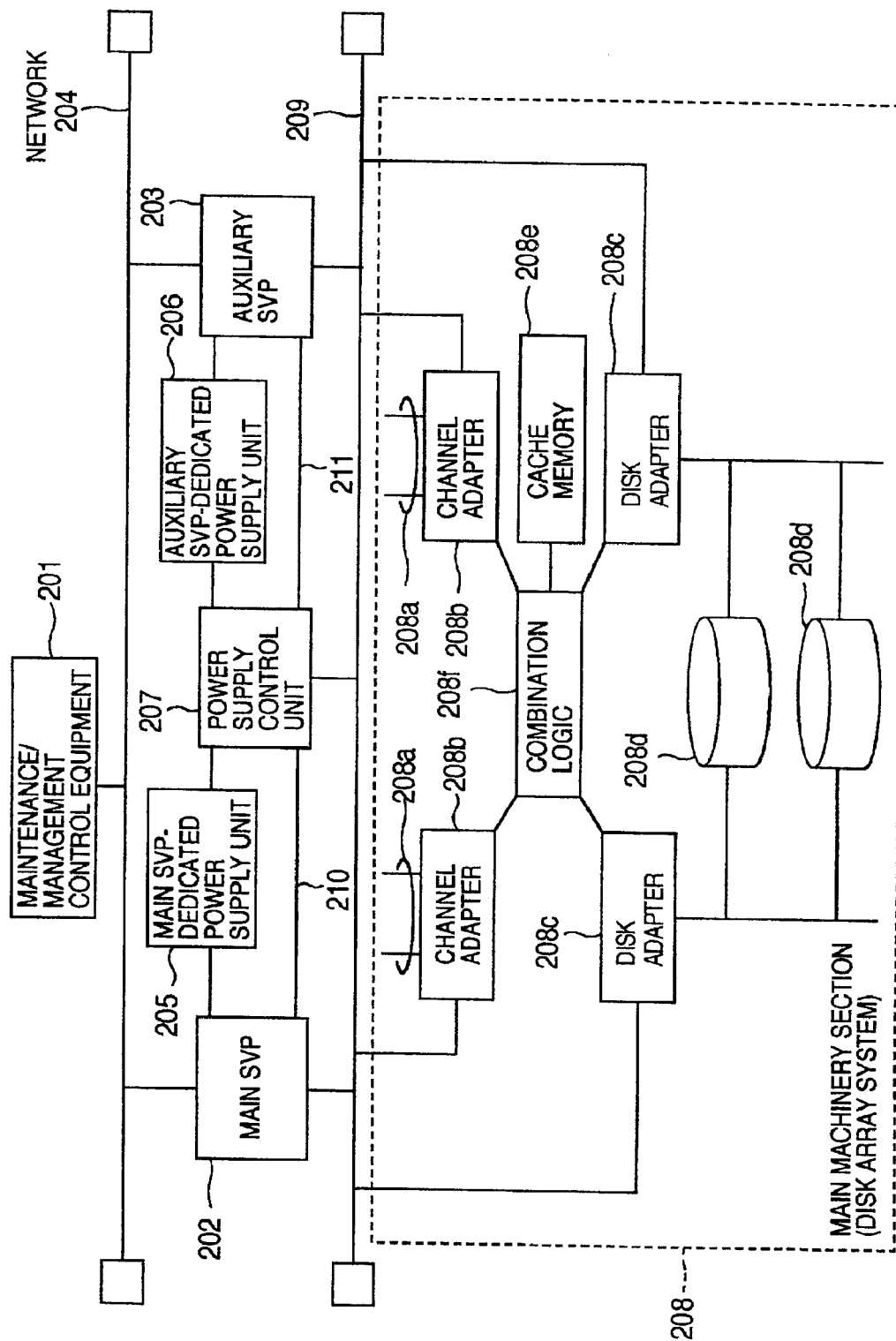
FIG. 8 is a conceptional block diagram showing schematically yet another exemplary configuration of a maintenance/management system in which a maintenance/management-subjected machine is implemented as a disk array system.

FIG. 8 shows a concrete example of the structure of the main machinery section 208 which is subjected to the maintenance/management by the maintenance/management system according to the embodiment of the present invention shown in FIG. 3.

Referring to FIG. 8, there is illustrated, by way of example, a disk array system as the main machinery section 208.

The disk array system representing the main machinery section 208 in the maintenance/management system according to the embodiment now under consideration is comprised of a plurality of channel adapters 208*b* for controlling transfers or transactions of information with units or devices of higher ranks (levels) (not shown) through the medium of channel ports 208*a*, a plurality of disk adapters 208*c* implemented with redundancy for controlling disk arrays 208*d* including a plurality of disk devices which constitute a so-called RAID (Redundant Arrays of Inexpensive (or Independent) Disks), a cache memory 208*e*, a combination logic 208*f* such as a bus, switch and the like for interconnecting the channel adapters 208*b*, the disk adapters 208*c*, the cache memory 208*e* and others.

The channel adapters 208*b*, the disk adapters 208*c* and others are equipped with network interfaces (not shown), respectively, so that they can be connected to an internal network 209 to thereby allow the operations thereof to be managed by the external maintenance/management control equipment 201 through the medium of the main SVP 202 or the auxiliary SVP 203.

The data to be written as received from the higher level device (not shown) via the channel port 208*a* is once stored in the cache memory 208*e*, whereon the data are distributively stored in the disk arrays 208*d* together with redundancy data generated from the written data.

On the other hand, the data read out from the disk array 208*d* in response to the request issued from the higher-level device are sent thereto through the medium of the cache memory 208*e* and the channel port 208*a*.

In the disk array system described above, not only the components inclusive of the disk arrays 208*d* are implemented with redundancy but also redundancy data are added with the aim of enhancing the reliability of the system as well as the data stored. Accordingly, adoption of the redundant structure which includes the main SVP 202 and the auxiliary SVP 203 interchangeable mutually as the SVP for managing the disk array system can contribute to enhancement of the reliability with significantly high effectiveness.

However, in view of the so-called multi-vendor trend (i.e., trend of system components being commercially available from different manufacturers) in recent years, there may arise such situation that the manufacturer of the external maintenance/management control equipment 201 is not always same as that of the disk array system equipped with the main SVP 202 and the auxiliary SVP 203.

Ordinarily, when the main SVP 202 and the auxiliary SVP 203 are disposed so as to be interchangeable with each other, troublesome alteration of the specifications such as alteration or change of the network address or the like is indispensably required for the maintenance/management control equipment 201 in order to cope with the interchange of the main SVP 202 with the auxiliary SVP 203 or vice versa. However, according to the teachings of the present invention incarnated in the embodiments thereof described above, the auxiliary SVP 203 can perform the maintenance/management processing in place of the main SVP 202 without coming under the notice of the maintenance/management control equipment 201 upon occurrence of fault in the main SVP 202. Accordingly, so far as the generalized SNMP (Simple Network Management Protocol) is abode by, troublesome alteration of the specification on the basis of the maintenance/management control equipment 201 is rendered utterly unnecessary, whereby operation suited or proper to the maintenance/management control equipment 201 (SNMP manager program 215) can be ensured for all the maintenance/management control equipments so long as they conform to the SNMP.

To say in another way, in the disk array system which is implemented with redundancy in respect to the SVP in that it includes the main SVP 202 and the auxiliary SVP 203 and which requires no change or alteration of the specifications of the maintenance/management control equipment 201 (SNMP manager program 215), the reliability of the disk array system can significantly be enhanced, to a great advantage.

Parenthetically, it should also be added that similar advantage can be obtained when the disk array system is employed as the main machinery section 208 in the system described hereinbefore by reference to FIG. 1.

As can now be understood from the foregoing description, by virtue of the arrangement that the SVP for managing the main machinery section 208 is implemented in the interchangeable redundant structure comprised of the main SVP 202 and the auxiliary SVP 203, discriminative identification of the faulty location can be realized with high accuracy by means of the maintenance/management control equipment 201 disposed at a remote site upon occurrence of fault in the main machinery section 208 or others. More specifically, the faulty location which heretofore could not be identified without paying visit to the site where the trouble suffering apparatus is installed can discriminatively be identified by the maintenance/management control equipment 101. Thus, the time required for taking proper measures for acquiring the parts for replacement and replacing the parts can considerably be reduced, whereby the system utility and performance, i.e., system availability, can significantly be improved.

Further, even though the SVP serving as the network connecting section for the maintenance/management-subjected machine 212 is constituted in duplex by the main SVP 202 and the auxiliary SVP 203 which are interchangeable, respectively, it is sufficient to register only one network address in the maintenance/management control equipment 201. Accordingly, by adopting the management protocol for more general purpose such as SNMP or the like, there can be realized the maintenance/management function of high reliability owing to the duplex configuration such as mentioned above even under the general-purpose or generalized maintenance/management program running on the maintenance/management control equipment 201 provided by a third vender.

As is apparent from the foregoing description, there has been provided according to an aspect of the present invention a method of performing maintenance/management on a maintenance/management-subjected machine (102; 212) with the aid of a maintenance/management control equipment (101; 201) by way of an information network, the maintenance/management-subjected machine being comprised of a main machinery section (106; 208), a first maintenance/management processing unit (104; 205) and a second maintenance/management processing unit (105; 206) which are connected to the information network and have first and second logical addresses, respectively, on the information network, the method includes:

step a) of executing maintenance/management processing for the main machinery section by means of the first maintenance/management processing unit on the basis of commands issued by the maintenance/management control equipment when the first maintenance/management processing unit is operating, while placing the second maintenance/management processing unit in a standby state, and step b) where upon detection of abnormality of the first maintenance/management processing unit, the second maintenance/management processing unit placed in the standby state takes over maintenance/management processing for the main machinery section from the first maintenance/management processing unit by rewriting the second logical address assigned to the second maintenance/management processing unit to the first logical address assigned to the first maintenance/management processing unit, the first logical address being different from the second logical address.

Further, according to another aspect of the present invention, there has been provided an information processing system which includes a first information processing unit (104; 205) and a second information processing unit (105, 106; 206, 207, 208) both connected to an information network and assigned with different logical addresses, respectively, the first information processing unit and the second information processing unit being arranged to be capable of interchanging each other;

a first power supply unit (108; 205) for feeding electric power to the first information processing unit; and a second power supply unit (107; 206) for feeding electric power to the second information processing unit independently from the first power supply unit, wherein the second information processing unit includes an operation supervising means (106; 207, 208) for supervising operation of the first information processing unit in the course of operation of the first information processing unit, and wherein when the operation supervising means detects occurrence of abnormality in the operation of the first information processing unit, the second information processing unit responds thereto by interrupting power supply to the first information processing unit from the first power supply unit while logical address assigned to the second information processing unit is replaced by logical address assigned to the first information processing unit.

Incidentally, as the network protocol which can be adopted in place of TCP/IC in carrying out the present invention, there may be mentioned NetBIOS, Internet Packet Exchange (IPX), AppleTalk, DECnet and so forth.

Further, the maintenance/management function contemplated by the present invention can equally be realized in such a manner that a http (hypertext transfer protocol) server is packaged in the maintenance/management-subjected machine (e.g. main maintenance/management processing unit 104 and auxiliary maintenance/management processing unit 105 in the system shown in FIG. 1; main SVP 202 and auxiliary SVP 203 in the system shown in FIG. 3) so that the external client unit (corresponding to the maintenance/management control equipment 101 and 201) can make access to the "http" server. In that case, the operator of the client unit (e.g. 101 or 201) can perform the maintenance/management processing while viewing the web image.

Besides, such arrangement may equally be adopted that upon detection of occurrence of fault or abnormality in the power supply system (power supply unit 108 for the main maintenance/management processing unit or main SVP-dedicated power supply unit 205), the auxiliary maintenance/management processing unit 105 (or the auxiliary SVP 203) which is in the standby state rewrites its own logical address by that of the main maintenance/management processing unit 104 (or the main SVP 202) to thereby take over the maintenance/management processing for the main machinery section from the main maintenance/management processing unit 104 (or the main SVP 202).

Figure 2:
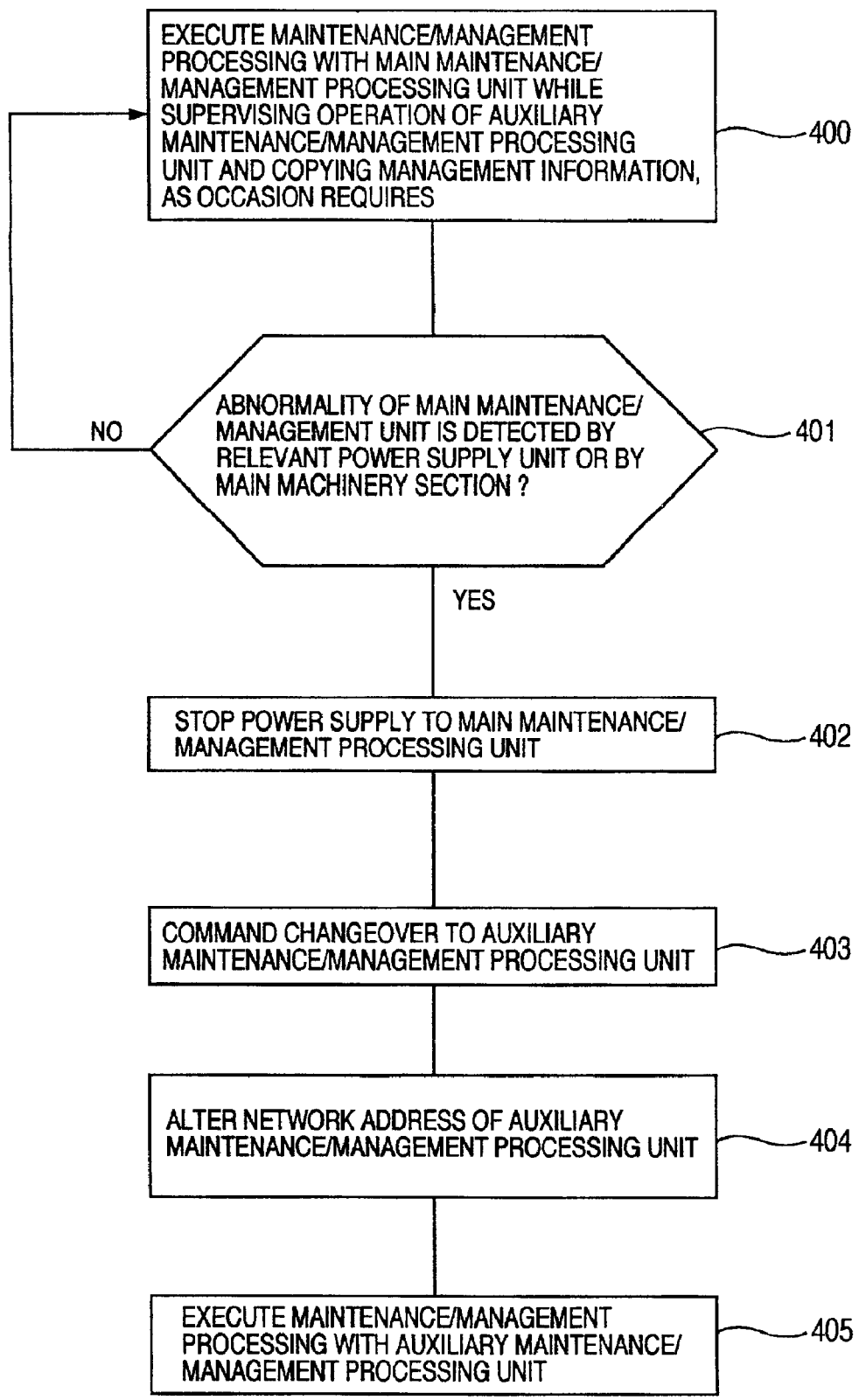
FIG. 2 is a flow chart for illustrating an exemplary operation of the maintenance/management system shown in FIG. 1.

Additionally, in conjunction with the embodiments described hereinbefore, the processing program illustrated in the flow chart of FIG. 2 may be installed in both the main maintenance/management processing unit 104 and the auxiliary maintenance/management processing unit 105 in advance. Similarly, the processing program illustrated in the flow chart of FIGS. 4 and 5 may previously be installed in both the main SVP 202 and the auxiliary SVP 203. Instead, the processing programs illustrated in FIGS. 2, 4 and 5 may be installed posteriorly. More specifically, the processing program(s) may be recorded on a recording medium such as a CD-ROM or the like. In that case, a recording medium reader unit 150 (see FIG. 3) may be connected to e.g. the network 204 (or 102 or 209) for reading the program recorded on the recording medium to be written into the main SVP 202 and the auxiliary SVP 203 (or alternatively into the maintenance/management-subjected machine 103 and the auxiliary maintenance/management processing unit 105). Alternatively, the processing program may be downloaded into the main SVP 202 and the auxiliary SVP 203 (or alternatively into the main maintenance/management processing unit 104 and the auxiliary maintenance/management processing unit 105) via the network to be written therein.

The present invention incarnated by the inventor has been described in detail in conjunction with the exemplary or preferred embodiments. However, the present invention is never restricted to these embodiments, but all suitable modifications and equivalents may be resorted to within the spirit and scope of the invention.

What is claimed is:

1. A method of performing maintenance/management on a maintenance/management-subjected machine with the aid of maintenance/management control equipment by way of an information network, said maintenance/management-subjected machine being comprised of a main machinery section, a first maintenance/management processing unit and a second maintenance/management processing unit which are connected to said information network and have first and second logical addresses, respectively, on said information network, a first power supply unit and a second power supply unit for independently feeding electric power to said first maintenance/management processing unit and said second maintenance/management processing unit, respectively, and a power supply control unit for controlling said first power supply unit and said second power supply unit, said method comprising:
a step in which said second maintenance/management processing unit is placed in a standby state and is in said standby state during a time in which said first maintenance/management processing unit is executing maintenance/management processing for said main machinery section on a basis of commands of said maintenance/management control equipment;
a step in which said power supply control unit checks an operation of said first maintenance/management processing unit;
a step in which said power supply control unit stops feeding of electric power to said first maintenance/management processing unit and starts feeding of electric power to said second maintenance/management processing unit in a case where said power supply control unit detects an abnormality of said first maintenance/management processing unit through said operation check; and
a step in which, after said power supply unit starts the feeding of electric power to said second maintenance/management power unit, said second maintenance/management processing unit ends the standby state and takes over maintenance/management processing for said main machinery section from said first maintenance/management processing unit by rewriting said second logical address assigned to said second maintenance/management processing unit to said first logical address assigned to said first maintenance/management processing unit, said first and second logical addresses being common addresses for said first and second maintenance/management processing units.

2. A method according to claim 1, wherein
in said step in which said power supply control unit stops feeding of electric power to said first maintenance/management processing unit, said power supply control unit controls a first power supply on/off control switch for the first maintenance/management processing unit to stop the feeding of electric power to said first maintenance/management processing unit, and said power supply control unit controls a second power supply off/on control switch for the second maintenance/management processing unit to start the feeding of electric power to said second maintenance/management processing unit.

3. A method according to claim 1,
in said step in which said second maintenance/management processing unit ends the standby state and takes over the maintenance/management processing for said main machinery section, said power supply control unit controls the second maintenance/management processing unit to end the standby state and take over the maintenance/management processing for said main machinery section from said first maintenance/management processing unit by issuing a request for changing over the maintenance/management processing to the second maintenance/management processing unit from the first maintenance/management unit, thereby causing said second logical address to be rewritten to said first logical address.

4. A maintenance/management system for performing maintenance/management on a maintenance/management-subjected machine with the aid of maintenance/management control equipment by way of an information network, comprising:
a main machinery section;
a first maintenance/management processing unit and a second maintenance/management processing unit which are connected to said information network and have first and second logical addresses, respectively, on said information network; and
a power supply control unit arranged to control power supply to said first and second maintenance/management power units;
said first maintenance/management processing unit and said second maintenance/management processing unit being so arranged as to realize such control logic that maintenance/management processing for said main machinery section is executed by means of said first maintenance/management processing unit on the basis of commands of said maintenance/management control equipment while said second maintenance/management processing unit is placed in a standby state, when said first maintenance/management processing unit is operating, and that upon detection by said power supply control unit of an abnormality of said first maintenance/management processing unit, said power supply control unit stops feeding of electric power to said first maintenance/management processing unit and causes said second maintenance/management processing unit to end the standby state and take over maintenance/management processing for said main machinery section from said first maintenance/management processing unit by rewriting said second logical address assigned to said second maintenance/management processing unit to said first logical address assigned to said first maintenance/management processing unit, said first logical address being different from said second logical address.

5. A maintenance/management system according to claim 4,
wherein said first maintenance/management processing unit and said second maintenance/management processing unit include first and second power supply units, respectively, which are independent of each other, said first and second power supply units being controlled by said power supply control unit, and
wherein upon the detection of an abnormality in said first maintenance/management processing unit, said power supply control unit stops said first power supply unit from supplying power to said first maintenance/management processing unit.

6. A maintenance/management system according to claim 4, wherein
said first maintenance/management processing unit and said second maintenance/management unit include first and second power supply units, respectively, which are independent of each other, said first and second power supply units being controlled by said power control unit; and
wherein each of said first and second power supply units includes a power supply on/off control switch controlled by said power supply control unit to control power supply of power to said first and second maintenance/management processing units, respectively.

7. An information processing system, comprising:
a first information processing unit and a second information processing unit both connected to an information network and assigned with different logical addresses, respectively, said first information processing unit and said second information processing unit being arranged to be capable of interchanging with each other, a first power supply unit for feeding electric power to said first information processing unit; and a second power supply unit for feeding electric power to said second information processing unit independently from said first power supply unit, wherein said second information processing unit includes operation supervising means for supervising operation of said first information processing unit in the course of operation of said first information processing unit; and wherein when said operation supervising means detects occurrence of an abnormality in the operation of said first information processing unit, the second information processing unit responds thereto by interrupting power supply to said first information processing unit from said first power supply unit and causes a logical address assigned to said second information processing unit to be replaced by a logical address assigned to said first information processing unit.

8. A computer program embodied on a computer-readable medium for performing maintenance/management on a maintenance/management-subjected machine with the aid of a maintenance/management control equipment by way of an information network, said maintenance/management-subjected machine being comprised of a main machinery section, a first maintenance/management processing unit and a second maintenance/management processing unit which are connected to said information network and have first and second logical addresses, respectively, on said information network, said computer program including computer-executable instructions encoded in said computer-readable medium which, when executed by a computer, cause the computer to perform the steps of:

executing maintenance/management processing for said main machinery section by means of said first maintenance/management processing unit on the basis of commands of said maintenance/management control equipment while placing said second maintenance/management processing unit in a standby state, when said first maintenance/management processing unit is operating; and upon detection of abnormality of said first maintenance/management processing unit, causing said second maintenance/management processing unit to end the standby state and to take over maintenance/management processing for said main machinery section from said first maintenance/management processing unit by rewriting said second logical address assigned to said second maintenance/management processing unit to said first logical address assigned to said first maintenance/management processing unit, said first logical address being different from said second logical address.

9. A method of performing maintenance/management on a maintenance/management-subjected machine with the aid of maintenance/management control equipment by way of an information network, said maintenance/management-subjected machine being comprised of a main machinery section, a first maintenance/management processing unit and a second maintenance/management processing unit which are connected to said information network and have first and second logical addresses, respectively, on said information network, a first power supply unit and a second power supply unit for independently feeding electric power to said first maintenance/management processing unit and said second maintenance/management processing unit, respectively, and a power supply control unit for controlling said first power supply unit and said second power supply unit, said method comprising:

a step in which said second maintenance/management processing unit is placed in a standby state and is in said standby state during a time in which said first maintenance/management processing unit is executing maintenance/management processing for said main machinery section on a basis of commands of said maintenance/management control equipment;

a step in which said power supply control unit checks an operation of said first maintenance/management processing unit;

a step in which said power supply control unit stops feeding of electric power to said first maintenance/management processing unit in a case where said power supply control unit detects an abnormality of said first maintenance/management processing unit through said operation check; and a step in which, after said power supply control unit stops the feeding of electric power to said first maintenance/management power unit, said second maintenance/management processing unit ends the standby state and takes over maintenance/management processing for said main machinery section from said first maintenance/management processing unit by rewriting said second logical address assigned to said second maintenance/management processing unit to said first logical address assigned to said first maintenance/management processing unit, said first and second logical addresses being common addresses for said first and second maintenance/management processing units.

10. A method according to claim 9, wherein in said step in which said power supply control unit stops feeding of electric power to said first maintenance/management processing unit, said power supply control unit controls a power supply on/off control switch for the first maintenance/management processing unit to stop the feeding of electric power thereto.

11. A method according to claim 9, wherein in said step in which said second maintenance/management processing unit ends the standby state and takes over the maintenance/management processing for said main machinery section, said power supply control unit controls the second maintenance/management processing unit to end the standby state and take over the maintenance/management processing for said main machinery section from said maintenance/management processing unit by issuing a request for changing over the maintenance/management processing to the second maintenance/management processing unit from the maintenance/management unit, thereby causing said second logical address to be rewritten to said first logical address.

* * * * *